Figures 1, 2:
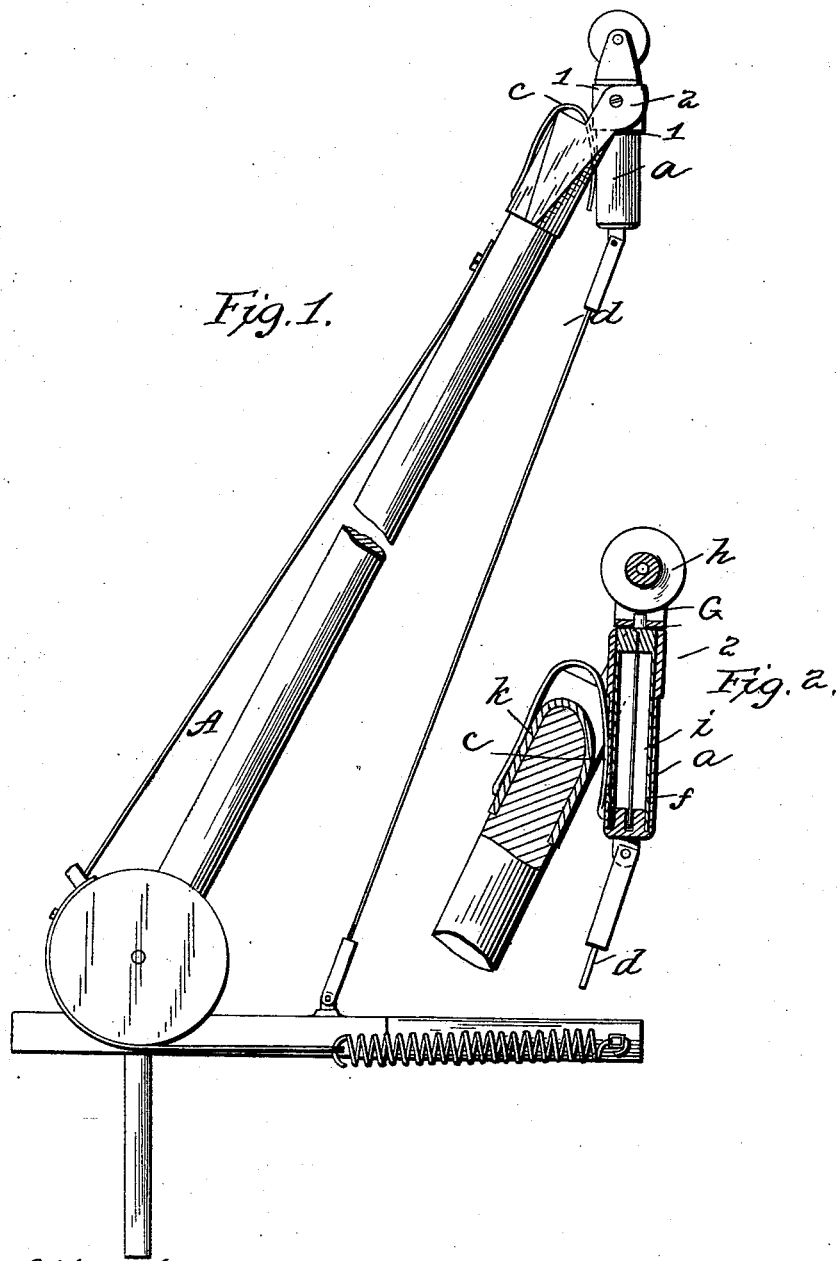

(No Model.)

Z. T. FURBISH & G. A. STAPLES.
TROLLEY.

No. 537,283. Patented Apr. 9, 1895.

Attest

Inventors
Zachry T. Furbish
George A. Staples
by
Atty.

UNITED STATES PATENT OFFICE.

ZACHRY T. FURBISH AND GEORGE A. STAPLES, OF AUGUSTA, MAINE, ASSIGNORS OF ONE-THIRD TO P. M. FOGLER, OF SAME PLACE.

TROLLEY.

SPECIFICATION forming part of Letters Patent No. 537,283, dated April 9, 1895.

Application filed September 25, 1894. Serial No. 524,048. (No model.)

*To all whom it may concern:*

Be it known that we, ZACHRY T. FURBISH and GEORGE A. STAPLES, citizens of the United States of America, residing at Augusta, in the county of Kennebec and State of Maine, have invented certain new and useful Improvements in Trolleys, of which the following is a specification.

Our invention hereinafter described, relates to overhead trolleys for electric railways, the object of the invention being to permit the trolley wheel to freely follow the wire, in turning curves, and thus to prevent the displacement of said wheel.

Our said invention is illustrated in the accompanying drawings, in which—

Figure 1, shows the apparatus in side elevation. Fig. 2, shows the trolley wheel and its shank and socket in vertical section.

In the drawings, A represents the trolley pole, which is pivoted to swing in vertical plane, on a platform pivoted to turn in horizontal plane, as usual; also the pole is sustained by springs as in those in common use.

On the end of the pole is a socket $a$, having a lug 1 which is pivoted in ears 2, on the end of the pole, so that the socket may swing in vertical plane. The lower part of the socket is normally pressed outward by means of a spring $c$, and it is drawn inwardly against said spring, by means of a connection $d$, made between the lower end of the socket and a point on the turn table of the pole, which point is at such distance from the pivoted point of the pole, that, as the pole tips or rises in vertical plane, the connection shall hold the socket in the same vertical position whatever may be the angle of inclination of the pole. This connection is shown at $d$, and may consist of a wire or any suitable equivalent.

The socket is fitted to receive the shank $f$, of the wheel support G, in which is pivoted the wheel $h$. The shank has fixed to it, a flat spring $i$, which, when the shank is in the socket enters a slot in the bottom of the socket. This spring is arranged to hold the wheel in the normal vertical plane, but to permit it to turn aside to right or left, as may be necessary in turning curves. It permits the wheel to follow the wire, but returns it to the normal plane when off the wire, and as the socket always maintains its vertical position the wheel is always with the support on which it is pivoted, in the same relation to the wire whatever the inclination of the pole.

The ears are on the cap $k$, which fits on the upper end of the pole, to which it is held removably, so that the pole may be turned when sprung.

We have braced the pole, by means of a wire connected to the upper end of the pole, and to the pivoted connection at the lower end of the same.

We claim—

1. In combination with a trolley pole, a pivoted socket a trolley wheel mounted on a shank adapted to fit the socket, a spring to hold the shank in normal position in the socket, and means for holding the socket in vertical position, substantially as described.

2. In combination with a trolley pole, a pivoted socket a trolley wheel mounted on a shank adapted to fit the socket, a spring to hold the shank in normal position in the socket, a spring $c$ and a connection between the lower end of the socket and the pole platform, substantially as described.

3. In combination with the pole, the removable cap having ears, a socket pivoted to said ears, a trolley wheel supported by the socket and a connection between the socket and the pole platform, substantially as described.

In testimony whereof we affix our signatures in presence of two witnesses.

ZACHRY T. FURBISH.
GEORGE A. STAPLES.

Witnesses:
W. H. FISHER,
E. W. WHITEHOUSE.